Patented Jan. 21, 1941

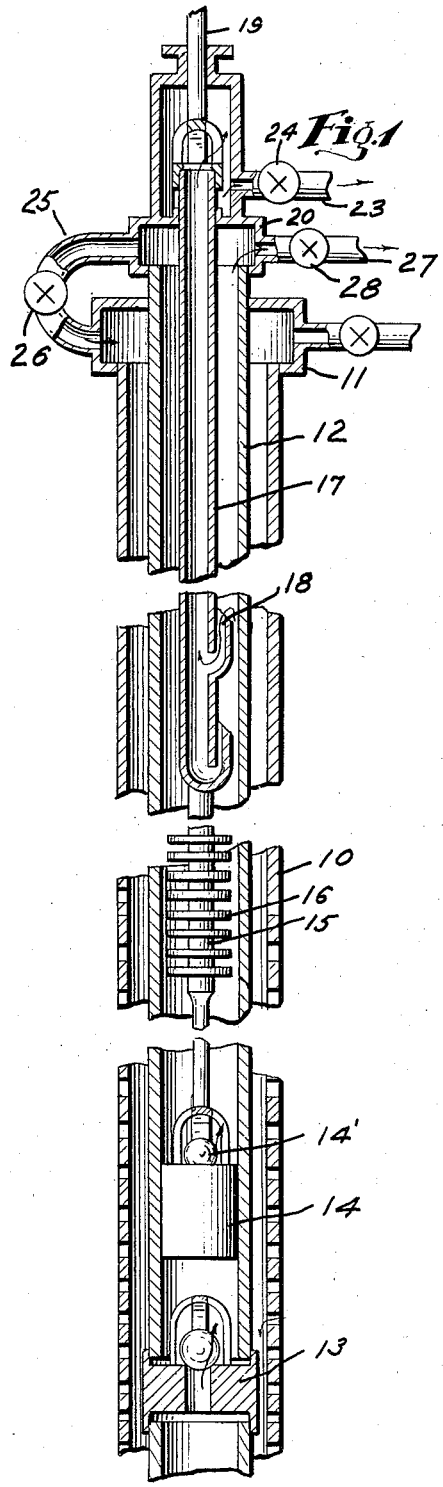
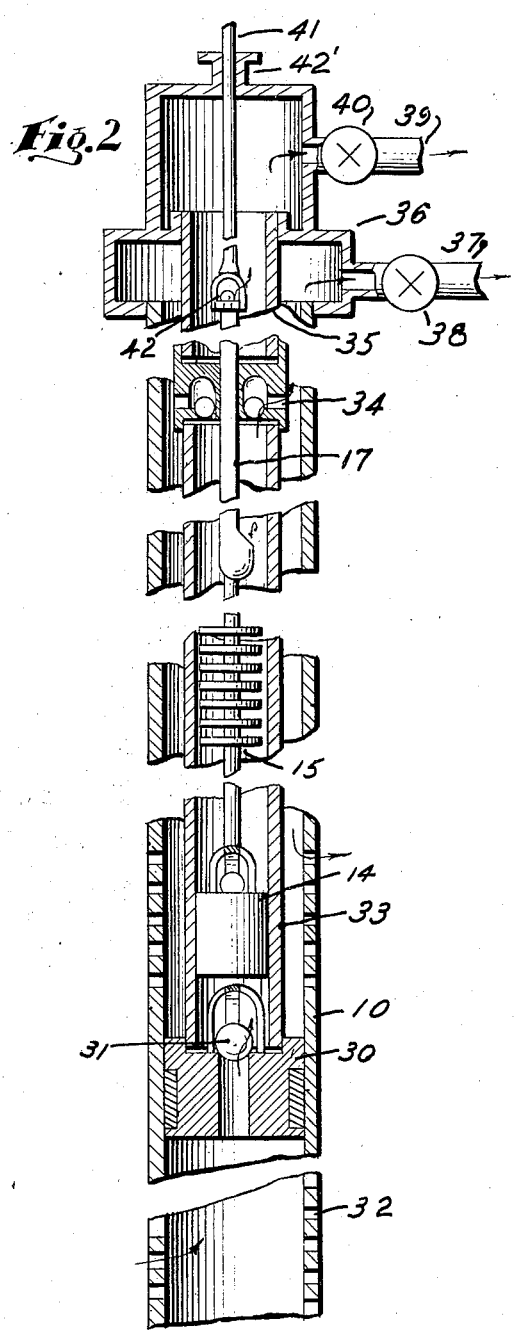

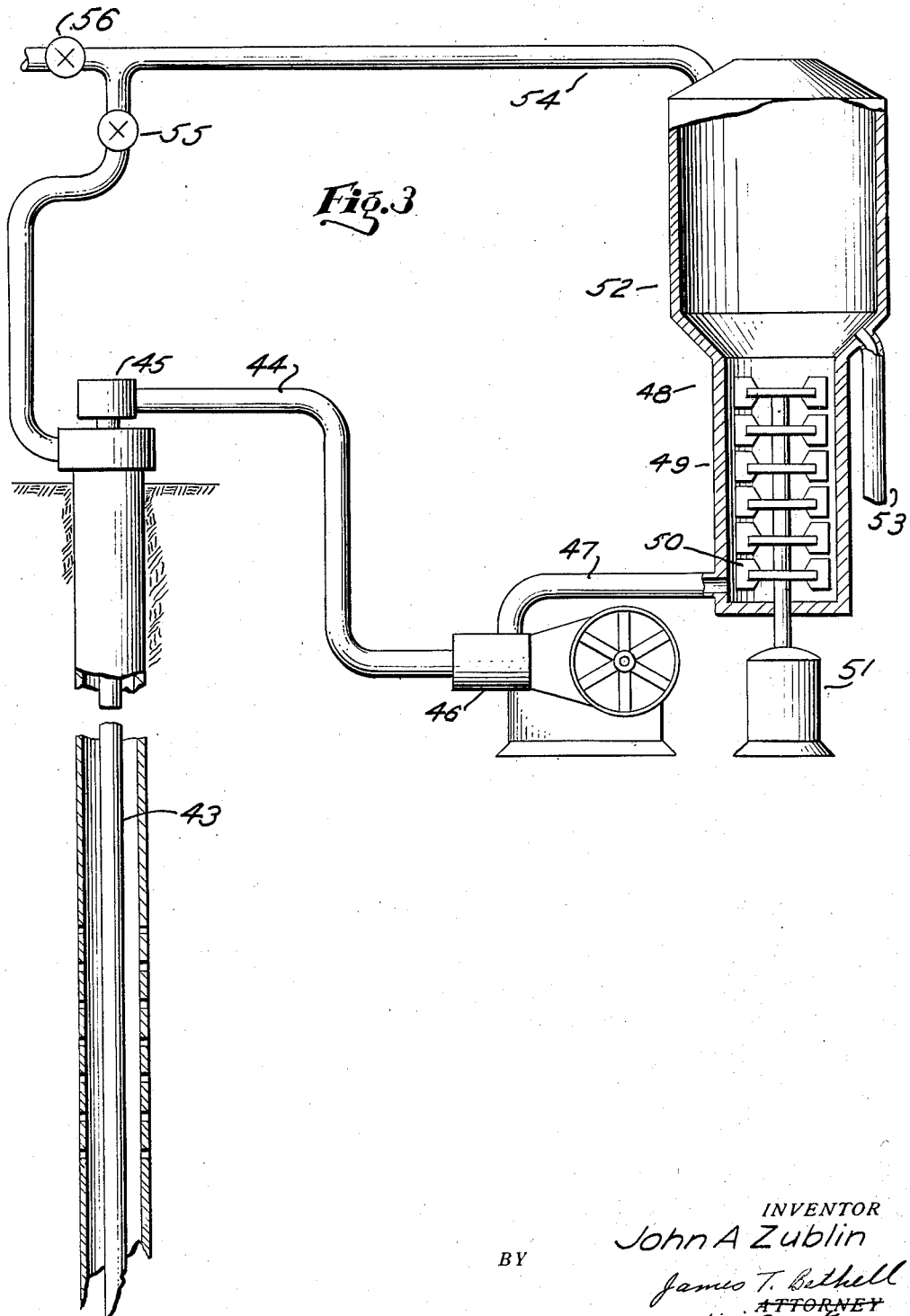

2,229,539

UNITED STATES PATENT OFFICE 2,229,539

METHOD OF AND APPARATUS FOR PRODUCING OIL AND GAS FROM A WELL

John A. Zublin, Los Angeles, Calif.

Application May 1, 1939, Serial No. 271,228

10 Claims. (Cl. 166—21)

This invention relates to the production of petroleum, more particularly, to the production of petroleum from flowing wells.

The modern operation of oil wells, aiming at the most efficient utilization of oil deposits, has evolved the technique of repressuring the formation; that is to say, of the gas and oil driven to the surface, at least part of the gas is returned to the formation, to make available more of the oil in the formation, and to delay the time when pumping must be resorted to to lift the oil to the surface. The usual method achieving this result is by separation of the oil gas mixture as delivered to the surface, at comparatively low pressures, and recompression of the gas. The gas is then driven into an intake well, from whence it finds its way into the formation, thus driving oil to the producing well.

Another method of conservation of the gas pressure in the formation is that outlined in my Patent No. 2,005,767, granted June 25, 1935, for a "Method and apparatus for operating oil wells." The method there involved consisted of separation of the oil and gas by passing it through a sort of centrifugal separator, the velocity of its passage being such to operate the separator and allow the separated gas to flow back into the formation.

The difficulties inherent in all types of repressuring operations are very great. Some of these difficulties are set by the geological nature of the formations which produce gas and oil. As examples, the pressures underground in a formation flowing gas and oil are of the order of several thousands of pounds. Further, the pressure which will force the gas into the formation may be greater than that delivering oil to the well. It may also happen that the pressure involved is much less. Further, it may be desired to return the gas to a different formation, in the producing well, from that which is flowing oil and gas to the well. Variations in the pressures, both of the producing formation and of the formation receiving the gas, from time to time, entail adjustments which cannot readily be made in the conventional apparatus.

In the operation of my patented separator, there are several inherent limitations in the structure. As the efficiency of the separation depends upon the velocity of the oil gas mixture up the eduction tube, and the best utilization of the oil, from the point of view of conservation, is dependent upon the flow, it may often happen that control of the flow at the surface by the Schaffer valve is not adequate to give the overall efficient withdrawal of oil and gas desired. Furthermore, there is no agitation at all during periods of no flow. From the modern point of view, utilizing formation gas pressures to operate mechanical devices is a wasteful process, and utilization of the gas pressures to lift the oil by entrainment of the gas and oil results in a higher gas oil ratio than would result if the oil were lifted by mere pressure, if possible.

In the patented apparatus there is a definite limit to the pressures obtainable by the gas upon agitation of the gas oil mixture. This pressure may not be sufficient, in some cases, to return the gas to the formation.

In the patented device there is no means for controlling the gas pressure except by controlling the flow of the gas and oil up the eduction tube. Control of this nature unavoidably results in loss of efficiency at some point or the other, as for example, in the agitator, or in the utilization of the oil existing in the formation, or elsewhere.

With the above limitations on the operation of wells flowing gas and oil, it becomes a general object of my invention to improve the gas oil ratio of a well.

It is a further object of my invention to provide means for agitation and compression which are independent of the flow of the gas, oil, or gas oil mixture.

It is a further object of my invention to increase the pressure of the gas and oil within the tubing to a pressure above the formation pressure.

It is a further object of my invention to provide a means of regulation of the gas pressure of the gas being recycled in the operation of the well.

It is a further object of my invention to build up the pressure of the gas oil mixture to a pressure above that of the gas in the casing.

It is a further object of my invention to lift the oil to the surface by gas pressure, obtained by separating the gas and oil, without necessary contribution to the lift of gas flowing up the eduction tube.

It is a further object of my invention to enable the utilization of the gas separated from the oil for the repressuring of different formations, in the same well, from the formation producing the oil and gas.

It is a further object of my invention to provide a gas pressure in the released gas for use in self-repressuring of wells, in excess of that provided by agitation of the gas oil mixture.

It is a further object of this invention to mechanically compress and agitate the gas and oil.

It is a further object of my invention to increase the pressure obtained by the separation of the gas and oil above that which would be obtained by mere agitation of the gas and oil.

It is a further object of this invention to increase the yield of high pressure gas by taking advantage of retrograde vaporization of the gas in the oil gas mixture.

Briefly, what I propose to do is to provide means for the compression of the gas oil mixture, to raise the pressure sufficiently so that upon agitation the released gas will have a pressure sufficient to enable its use in repressuring the same well, or other wells.

It will be seen that by this mode of operation of a well, the compressor work upon free gas is very much lessened, for in those wells flowing a mixture of gas and oil, there is a large proportion of gas in solution, occluded, mixed with the oil as a liquid phase, and so on, which would be expensive to compress if released from the oil and then compressed in the conventional manner. By compressing the mixture of gas and oil, I not only save the energy required to recompress these constituents, but also I save in compressor energy by driving some of the free gas back into solution, and the oil associated with the free gas absorbs the heat of compression of the free gas, thus further decreasing the compressor work. Other objects and advantages will become apparent as the description proceeds.

Referring to the drawings:

Figure 1 represents one form of my invention;

Figure 2 represents another form of my invention; and

Figure 3 represents another form of my invention, all figures being diagrammatic.

In Figure 1, the casing 10 of the usual form has a control head 11 tightly fitting the tube 12. This tube 12 extends to below the surface of the gas and oil in the well, and has a standing valve 13 in its length. In this tube 12 and above the ball valve 13 is a plunger, 14, with a travelling valve 14' thereon, as in ordinary deep well pump plungers.

Above the pump plunger 14 and connected thereto is an agitator unit 15, consisting, for example, of a series of vanes 16, of any suitable form, mounted on the small tube 17 extending to the surface. This tube 17 has openings 18 through its walls within the well, for a purpose presently to be explained.

The small tube 17 extends to the surface where it is connected to a reciprocating mechanism, not shown, by a rod 19.

The top of the tube 12 has a tubinghead of usual construction, represented by the part 20 in the drawings. Above the tubinghead 20 is the device 21, which is in effect a cylinder, with packing at each end thereof, through which the small tube 17 and the rod 19 are free to reciprocate.

From the cylinder 21 is a pipe 23, with valve 24, for the withdrawal of oil from the well. From the tubinghead to the casinghead is a pipe 25 with valve 26 controlling flow between the tubinghead and the casinghead. Also connected to the tubinghead is another pipe, 27, with valve 28, leading to another well.

The operation of my device should now be clear.

The reciprocation of the small tubing 17 by the rod 19 operates the pump plunger 14 to force a gas oil mixture into the tubing 12 at high pressure which can be above that of the formation producing the mixture. At the same time, this same motion operates the agitating mechanism, violently churning and agitating the oil. This agitation results in release of large volumes of gas, which separates from the oil and rises to the surface through the tubing 12. The separated oil passes through the openings 18 into the small tubing, whence it finds its way to the surface. At the surface the oil passes into the cylinder 21, and thence through the pipe 23 to oil storage.

The gas collecting in the tubinghead 20, having a pressure higher than the pressure of the gas oil mixture delivered by the formation, can be readily returned to the formation, by passing it through the pipe 25 to the casinghead, whence it finds its way to the formation, or else it may be driven to the formation through an intake well, the pressure of the gas as coming from the tubinghead being sufficient to do this without recompression of the gas.

Figure 2 illustrates an alternative form of construction for practicing my invention. In this figure, the casing 10 has a packer 30, containing a ball valve 31 set therein. Perforations 32 in the wall of the casing above and below the packer establish communication between the formations and the interior of the casing.

Connected with the packer 30 in such a manner as to permit flow from below the packer into itself is a tubing 33, containing a plunger and agitator unit 14 and 15, as in Figure 1, including a small tubing 17 for the passage of oil upwards. However, instead of conveying the gas to the surface as in Figure 1, gas valves 34 are provided, which admit the gas directly to the casing.

The small tubing passes through this gas valve to the oil tubing 35, and has its upper end provided with a valve 42 to permit the separated oil to flow into the tubing 35, but not from the tubing 35 into the separator chamber.

At the top of the well is provided the conventional bradenhead 36, supplying a closure for the casing and the tubing 35, and pipe 37 leading from the casing space, provided with a valve 38. From the tubing space in the head is a pipe 39 and valve 40, for withdrawal of oil.

To actuate the plunger and agitator assembly, I have illustrated a sucker rod 41 passing through the packing 42' of the bradenhead, and attached to the tube 17. This sucker rod is driven by any suitable means, such as are used in pumping wells.

The operation of this form of my invention is as follows: The gas oil mixture as delivered by the formation to the casing rises past the valve 31 into the tube 33. There it is compressed above the plunger 14, and violently agitated by the agitator assembly 15. The separated gas flows out through the gas valves 34 into the casing. The oil flows up the small tubing 17, as in Figure 1, past the gas valve 34, to the oil string 35 whence it finds its way to the surface, out the pipe 37 to storage.

Because of the presence of the packer 30, and the combined agitating and compressing action of the mechanism in tube 33, the gas in the upper part of the casing can be higher in pressure than the pressure existing in the oil formation. The formation above the oil formation can then be repressured without directly affecting the oil flow.

In Figure 3 I have illustrated another form of apparatus for carrying out my invention: In this form, the oil flows to the surface through the eduction tube 43, as in the conventional flowing well. A pipe, 44, leading from the tubinghead, goes to the intake of a compressor 46. Another pipe 47 from the discharge side of the compressor goes to the agitator and separation unit 48. This unit consists of an agitation chamber 49, containing agitators 50, driven by a motor 51, or else operated by the stream of oil, as in my patented device. Any other agitator desired may be used.

Above the agitation chamber I have illustrated a separation chamber 52, in which the oil and the gas released by agitation separate. The oil flows out through pipe 53, to wherever it is delivered for disposal, and the gas flows out the top of the separation chamber through pipe 54. Pipe 54 leads it to the same well by valve 55, or to a different well, by valve 56. When introduced to the casing of a producing well, it finds its way back into the formation through the perforations in the casing, and exerts a self-repressuring influence on the well, as in my patented device above referred to.

The operation of my apparatus can be carried out within the range at which retrograde pressure vaporization takes place. That is to say, the apparatus may be so controlled as to vaporize part of the oil when the pressure is increased by compression and agitation, or even the agitation which follows the compression. The use of retrograde vaporization products in the repressuring of formations could be made to prolong the flowing life and ultimate yield of a formation.

I wish it understood that these embodiments are illustrative only, and not limitations. For instance, the agitation chamber and separation chamber are shown together, but it may be desirable to have them separate. Various other modifications will doubtless occur to those skilled in the art. Various means to convey the compressive and agitating energy below the surface, as a rotating shaft, a cable, hydraulic power or a motor within the well, can be readily adapted as is deemed expedient.

What I claim as my invention is:

1. In the method of operating a well flowing a mixture of gas and oil, the steps of compressing the gas oil mixture, agitating the compressed mixture to release at least part of the gas, separating the released gas from the oil, and flowing the released gas back into the formation.

2. The method of operating a well flowing a mixture of oil and gas to the casing thereof which includes compressing the mixture, agitating the compressed mixture to release gas therefrom, separating the released gas from the oil, flowing the separated gas to an oil bearing formation and delivering the gas-freed oil to appropriate disposal.

3. The method of operation of an oil well which delivers a mixture of gas and oil to the casing which includes the compression of the gas and oil mixture, agitation to release gas and thereby increase the pressure through a range in which some of the liquid oil undergoes retrograde vaporization, separating the gas and vaporized oil, and returning the gas and vaporized oil to the formation.

4. Apparatus for the production of oil from a well flowing a mixture of gas and oil from the formation including a chamber, a valve admitting the gas oil mixture to said chamber, compressor means to compress the gas oil mixture, an agitator in said chamber, means for passing the gas released by the agitation back to the formation, and means for discharging the gas freed oil from said chamber.

5. Apparatus for the operation of a well flowing a mixture of gas and oil to the casing thereof comprising a tube extending within the casing from the surface of the ground to the oil producing formation, a standing valve permitting flow of the gas oil mixture into said tube, a second tube within said first mentioned tube, means for reciprocating said second tube, means actuated by said second tube for compressing the gas oil mixture, agitators on said second tube for agitating the compressed gas oil mixture to release gas therefrom, a passageway through said second tubing permitting the gas freed oil to flow to the surface and means for discharging the released gas into the well external said first mentioned tube.

6. Apparatus for the production of oil from a well flowing a mixture of gas and oil, including a casing, a packer therein above the producing zone, a chamber in communication with the producing zone, a valve permitting flow from the producing zone to the chamber only, compressor means in the chamber, agitator means in the chamber, whereby the gas oil mixture is compressed and agitated to separate the gas and oil, means conducting the gas and oil to the surface, and means admitting the gas and oil to the casing above the packer.

7. The apparatus of claim 6 which includes a conduit for conducting the released gas from the casing to another well.

8. The device of claim 6 which includes perforations in the casing above the packer, whereby the gas released by the compression and agitation is admitted to an oil bearing formation at a higher level than that flowing the gas oil mixture into the casing.

9. Apparatus for the operation of a well flowing a mixture of gas and oil which includes a compressor for the mixture of gas and oil, an agitator for the compressed gas and oil, means allowing the gas released by agitation to separate, and means conducting the gas to an oil bearing formation and means for flowing the oil to storage.

10. The apparatus of claim 9, in which the gas is conducted to an oil bearing formation through an intake well.

JOHN A. ZUBLIN.